United States Patent

Griesinger

[11] Patent Number: 6,049,387
[45] Date of Patent: Apr. 11, 2000

[54] PROCESS FOR DETERMINING THE CONDITION OF A ROAD SURFACE AND SYSTEM FOR IMPLEMENTING THE PROCESS

[75] Inventor: Manfred Griesinger, Leonberg, Germany

[73] Assignee: DaimlerChrysler AG

[21] Appl. No.: 09/136,927

[22] Filed: Aug. 20, 1998

[30] Foreign Application Priority Data

Aug. 20, 1997 [DE] Germany .......................... 197 36 138
Feb. 26, 1998 [EP] European Pat. Off. ............. 98103365

[51] Int. Cl.$^7$ .......................... G01N 21/27; G01N 21/47
[52] U.S. Cl. .................. 356/419; 356/328; 250/339.11; 340/583
[58] Field of Search .................................. 356/416, 419, 356/326, 328; 250/226, 339.11; 340/580, 583

[56] References Cited

U.S. PATENT DOCUMENTS

| 4,687,329 | 8/1987 | Schultz | 250/226 |
| 5,166,755 | 11/1992 | Gat | 356/419 |

FOREIGN PATENT DOCUMENTS

| 30 23 444 | 6/1981 | Germany . |
| 35 45 366 A1 | 3/1986 | Germany . |
| 40 40 842 A1 | 4/1992 | Germany . |
| 41 41 446 C1 | 6/1993 | Germany . |
| 41 33 359 A1 | 9/1993 | Germany . |
| 38 41 333 C2 | 2/1997 | Germany . |
| 197 36 138 | 8/1997 | Germany . |
| WO 96/26430 | 5/1996 | WIPO . |
| WO 97/27077 | 1/1997 | WIPO . |

*Primary Examiner*—F. L. Evans
*Attorney, Agent, or Firm*—Evenson, McKeown, Edwards & Lenahan, P.L.L.C.

[57] ABSTRACT

In a process and apparatus for determining the condition of a road surface, light backscattered from a road surface is divided into spectral components and the spectral intensity distribution of the backscattered light is analyzed. The wavelength-dependent backscattered light spectrum of a dry road surface is arranged with a mathematical function with free parameters. This function is multiplied by an exponential absorption term which describes the light transmission of a water layer of a defined thickness in order to obtain a mathematical function for the wavelength-dependent distribution of the backscatter intensity (as it impinges on the receiver). Using the actual measured values, the free parameters of the function can then be calculated to obtain a best possible approximation. This among other things, results in a determination of the thickness of the water layer. In order to implement the process, the system is a spectrometer which uses an absorbing element applied directly to a CCD sensor line in place of a dispersive element.

22 Claims, 2 Drawing Sheets

PROCESS FOR DETERMINING THE CONDITION OF A ROAD SURFACE AND SYSTEM FOR IMPLEMENTING THE PROCESS

BACKGROUND AND SUMMARY OF THE INVENTION

This application claims the priority of German patent documents EP 98103365.7 and DE 197 36 138.2, filed Feb. 26, 1998 and Aug. 20, 1997, respectively, the disclosures of which are expressly incorporated by reference herein.

The invention relates to a process and apparatus for determining the condition of a road surface in which backscattered light is divided into spectral components, and the wavelength-dependent course of the backscatter intensity is analyzed.

The process is specifically used for qualitatively, and preferably quantitatively, detecting the presence of water or ice on the road surface and can be implemented via a system mounted in a vehicle.

A process of essentially this type, described in German Published Patent Application DE 41 33 359 A1 makes it possible (in a no-contact manner) to detect the thickness of a water layer on a road. For this purpose, the light beamed onto the road surface contains at least two wavelengths from the short infrared range, which are subjected to a water absorption of different intensities. For example, for a sensitive measuring range, a measuring wavelength at 1,450 nm and a comparative wavelength at 1,190 nm with a comparatively lower absorption are selected. For an insensitive measuring range, a measuring wavelength of 1,190 and a comparatively even lower absorbed comparative wavelength of 1,080 mm are selected. Assuming an exponential law of absorption and a "gray" road surface (that is, one which absorbs all wavelengths at the same ratio), the thickness of a layer of water present on the road surface is thus determined.

The assumption of a gray radiator for the road surface is critical. In fact measurements on various road coverings have demonstrated that it is valid only to a limited extent. Some road coverings, for example, exhibit a noticeable rise of their spectral reflection capacity with an increasing wavelength. A demand therefore exists for a process which is largely independent of the spectral reflection capacity of the road surface. In addition, a process is desirable which, as required, can be designed such that it is also suitable for recognizing ice or snow coverings on the road surface.

German Patent Document DE 41 41 446 C1 discloses a process for measuring the thickness of a layer of water, snow or ice on a road surface based on run-time measurements.

German Published Patent Application DE 30 23 444 A1 discloses a device for determining road conditions, in which infrared radiation having a wavelength at which the reflection capacity of snow is lower than that of dry road surface, is beamed onto the road surface. The backscattered light is then compared with reference signal levels which correspond to previously classified conditions of the road surface.

In the process for monitoring the condition of a road described in German Patent Document DE 38 41 333 C2, electromagnetic radiation is beamed onto a tread surface of a vehicle wheel that is in contact with the road, and backscattered radiation is analyzed.

German Published Patent Application DE 35 45 366 A1 discloses a measuring device for visually determining the thickness of a film of water situated, for example, on a metallic surface, in which light is beamed onto the film of water. The light contains a measuring beam of a wavelength that is absorbed by the film of water, and a reference beam of a wavelength which is subjected to no water absorption. The thickness of the film of water is then determined from the ratio of the measuring signal level representing the backscattered measuring beam fraction to the reference signal level representing the backscattered reference beam fraction, multiplied with a temperature correction coefficient. The measuring signal level and the reference signal level are optionally averaged over several measuring operations.

German Published Patent Application DE 40 40 842 A1 discloses an infrared microwave sensor system for recognizing the road condition (particularly, for recognizing whether the road is dry, wet or icy). This system contains networks consisting of one or several comparators, or one or several gates or flip-flops for processing the signals of an infrared or microwave receiver. Here the backscattered intensity of the electromagnetic radiation is analyzed for two different wavelengths or narrow wavelength bands and the quotient of these two intensities or of detector signal voltages derived therefrom is formed. According to the value of the determined quotient, a conclusion is drawn with respect to whether the road is dry, wet or icy.

Non-prior art German Patent Application DE 197 36 138 discloses a process for determining reliably and precisely the condition of a road surface (particularly with respect to the presence of water, ice and/or snow), at relatively low expenditures, and independently of the road covering. In this process, light beamed onto the road surface contains at least a first light ratio from a first wavelength range without any significant absorption by water or ice (including snow), and a second light ratio from a second wavelength range with a significant absorption by water/ice or snow. At least the first light fraction contains light of several different wavelengths. (The term "without significant absorption" means (in this case) that although there may be a certain low absorption, it is clearly lower than in the case of the wavelength range with a significant absorption.) The light backscattered by the road surface is detected and spectrally analyzed. For this purpose, an approximation reference curve is determined based on the spectral data obtained for a first backscattered light fraction pertaining to the several different wavelengths of the first light fraction. This can take place, for example, by determining the approximation reference curve as a parameterized compensating curve over the individual measuring points of these spectral data by using a customary compensating calculation. The approximation reference curve extends along the whole spectral course of the backscattered light, thus also along the wavelength range of the second light fraction with a significant absorption by water/ice. Starting from the measuring points in the wavelength range of the first light fraction (without significant water/ice absorption), the approximation reference curve is interpolated or extrapolated into the wavelength range of the second light fraction.

In this manner, the approximation reference curve forms a reference curve in the wavelength range of the second light fraction. This reference curve reflects at least, approximately, the spectral course of the backscattered light in this wavelength range in the case of a dry road surface. In the case of a wet or icy road, the spectral data of the backscattered light in the second wavelength range deviates noticeably from the approximation reference curve, because of corresponding absorption of the second light fraction by the water or ice. In a similar manner, the process also provides the determination of the difference between the spectral data of the second backscattered light fraction originating from the second light fraction and the corresponding data of the approximation reference curve for at least one wavelength of the second wavelength range. In order to become independent of the overall light intensity, the difference thus determined is preferably standardized to the overall light intensity, or to the fractions in the non-absorbing wavelength ranges, and provides a reliable qualitative as well as quantitative measurement for the presence of water or ice on the road surface.

In the described process, the first and the second light fractions, which are relevant to the analysis of the backscattered light, are preferably in the wavelength range of between approximately 800 nm and approximately 1,100 nm. This provides the advantage that the wavelength range (without a significant water/ice absorption) is composed of two partial ranges below and above the second wavelength range. As a result, measuring points for determining the approximation reference curve for the spectral course of the backscattered light (in the case of a dry road) exist on both sides of the second wavelength range. Subsequently, this spectral course can be precisely interpolated for the wavelength range in the case of significant water/ice absorption. Another advantage gained in the case of the selected wavelength range is that the penetration depth of the light is sufficiently large. This provides the ability to completely penetrate the water or ice layers typically existing on traffic routes. Furthermore, reasonably priced silicon photodetectors can be used as backscattered-light detectors and no special infrared detectors are required.

A similar process which is disclosed in International Patent Document WO96/26430. Furthermore, German Patent Application DE 197 36 138 discloses a further development of the process, in which the second light fraction also contains light of several different wavelengths. The difference between the spectral data of the backscattered light originating from the second light fraction on the other hand, and the corresponding data of the approximation reference curve is determined not only at a single point but at a corresponding number of points as a difference curve.

From the course of the difference curve, the condition of the road surface can be qualitatively and quantitatively determined in a relatively precise manner. For this purpose, among other things, the integral of the difference curve is determined via the second wave range. The resulting (preferably standardized) integral, forms a very precise measurement of the thickness of a film of water which may have formed on the road surface.

In a further development as set forth in WO 96/26530, the center of gravity of the difference curve is determined. It was found that, as the result of this knowledge of the center of gravity, a decision can be made as to whether a covering situated on the road surface is a water layer or an ice/snow layer. In the case of snow, the difference curve is similar to that for ice but has a lower amplitude so that an additional discrimination can be made between ice and snow.

Since the position of the center of gravity of the difference curve shifts toward larger wavelengths as the temperature of the water layer or ice layer decreases the temperature of the water layer or ice layer can be determined from the magnitude of the shift. The knowledge of the temperature of the water layer or ice layer (in addition to furnishing knowledge of the layer thickness), supplies valuable information for estimating the presence of dangerous slippery ice. If water is present on the road, and if the water temperature approaches the freezing point, the driver can be warned so that he has enough time to anticipate freezing conditions.

The prior processes for determining the condition of a road surface have the disadvantage that they require, as a prerequisite, the existence of ranges above or below the absorption wavelength of water/ice, in which no absorption takes place, and which can therefore be used for the reference formation in order to compensate the influences of the road surface. This prerequisite cannot always be met. This is particularly true in the case of larger wavelengths of above 1,100 nm. As a result, areas without any significant absorption by water/ice can no longer be isolated, and a reference curve cannot be formed.

The object of the present invention is to provide a process and apparatus with which the condition of a road surface can be determined.

Another object of the invention is to provide a process and apparatus for determining the presence of water, ice and/or snow on a road surface, reliably and precisely, with relatively low energy expenditures and independently of the road covering.

These and other objects and advantages are achieved by the process and apparatus according to the invention, in which backscattered light is divided into spectral components, and a wavelength-dependent plot of the backscatter intensity is analyzed. For this purpose, the wavelength-dependent backscattered-light spectrum of a dry road surface (road scatter coefficient) is arranged via a mathematic function having free parameters. This function is multiplied with an exponential absorption term which describes the light transmission of a water layer of a certain thickness in order to obtain a mathematical function for the wavelength-dependent course of backscatter intensity as it impinges on the receiver. When forming the absorption curves of water or ice (which are entered into the absorption term), the actual absorption curves of water or ice can advantageously be used as a basis for forming the absorption curves. By means of the actual measured values, the free parameters of the function can then be calculated in the sense of a best possible approximation. This among other things, results in a determination of the thickness of the water layer.

In the process according to the present invention, the backscatter intensity is formed by a mathematical function with free parameters. With the justified assumption that the contributions of the detectors are linearly independent of one another, each contribution furnishes an equation for an equation system which can be used for determining the model parameters. Here, the analysis will be simplified if δ-functions are used for the spectral sensitivity of the detectors (that is, if the spectral plot is analyzed in a punctiform manner, for example, point-by-point, interpolation, at different discrete wavelengths.

In another embodiment of the invention, the information concerning the backscattered light need not be present spectrally; rather, several detectors having different spectral sensitivities can be used. Their converted light intensity will be obtained as the integral of the wavelength via the product of the spectral sensitivity of the respective detector with the spectral backscatter intensity.

This analyzing process according to the invention has the additional advantage that it can also be used when the spectral information of the backscattered light is detected only indirectly. In particular, the process can be applied to a measuring arrangement that has a broad-band light source and broad-band detectors with different respective spectral sensitivities. In this case, the information concerning the plot of the curves when the road is dry and an absorption-caused downward shift of the spectral plot of the backscattered light are always present (that is, mixed) in the receiver signals.

In yet another advantageous embodiment of the process according to the invention, interference effects caused by ambient light can be mathematically eliminated by utilizing differentiating spectral characteristics between the ambient light and the sensor light. This is advantageous in comparison to other known processes, where a pulsed light source (chopper) must be used in order to eliminate the influence of ambient light.

In still another advantageous embodiment, the system according to the invention is a spectrometer which can be used not only for recognizing road conditions, but for all applications in which a spectrum must be measured. In contrast to known spectrometers, an absorbing element is used instead of a dispersive element. In this case, the absorbing element is applied directly to a CCD sensor line. In a specific version of the absorbing element, the spectral composition of the light can be determined from the measured intensities while using an inverse Fourier transform.

Other objects, advantages and novel features of the present invention will become apparent from the following detailed description of the invention when considered in conjunction with the accompanying drawings.

DETAILED DESCRIPTION OF THE DRAWINGS

Figure 1:
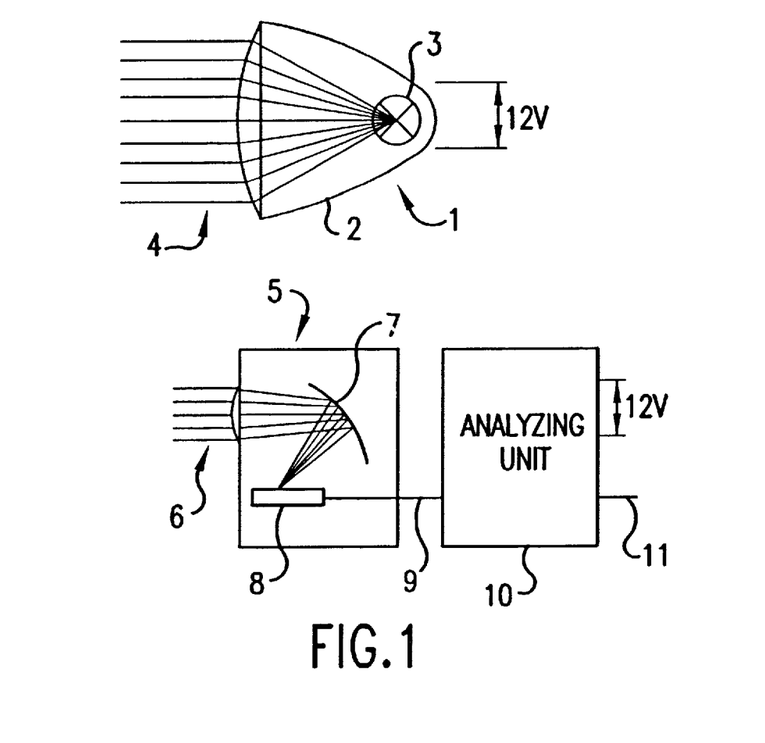
FIG. 1 is a schematic block diagram of a first system for implementing the process according to the invention for determining the condition of a road surface.

FIG. 1 illustrates a system suitable for implementing the process of the present invention, in which backscattered light is divided into spectral components and the resulting spectral intensity distribution of the backscattered light is analyzed. This system comprises a light generating unit 1 (sensor light) with a light source 3 arranged in the proximity of the focal point of a reflector 2. The light source 3 is fed by a 12V supply voltage, for example, from an on-board supply system of a motor vehicle, and emits light in a certain wavelength range in a broad-band manner. The range between approximately 800 nm and approximately 1,150 nm offers the advantage that reasonably priced detectors can be used. The emitted light leaves the reflector 2 as a cluster 4 of essentially parallel light beams which is beamed onto a road surface (not shown).

By way of a lens system and/or a fiber-optical light guide, a receiver 5 receives the light 6 backscattered to it from the road surface, via the lens system and/or fiber-optical light guide. The light 6 impinges on a dispersive element 7 of the receiver 5, where it is spectrally divided, and is reflected onto a silicon photodetector in the form of a CCD sensor line 8. The dispersive element 7 may be, for example, a diffraction grid, an interference filter or a prism. The output signal 9 of the CCD line 8 is fed to an analyzing unit 10 which is also fed by the 12V supply voltage and is connected to a data bus 11, such as a CAN bus.

The analyzing unit 10 (which may be, for example, a CPU or microprocessor) is designed in a suitable manner for analyzing the output signal 9 of the CCD line 8 according to the process of the present invention. Each pixel (that is, each scanning unit cell of the CCD line 8) receives backscattered light of a respective pertaining wavelength or of a pertaining narrow spectral line from the dispersive element 7. The contribution of each pixel of this type to the output signal 9 therefore corresponds to the backscattered light intensity in the respective wavelength. The analyzing unit 10 thus receives the spectral data of the backscattered light in the form of measuring values which correspond to the output signal contribution of the respective CCD line pixel as a function of the wavelength $\lambda$ for a certain number of measuring points corresponding to the number of CCD line pixels. In this manner, the analyzing unit 10 is able to determine the corresponding backscatter intensity for the various measuring wavelengths from the signals of the respective pixels of the CCD line 8.

Figure 3:
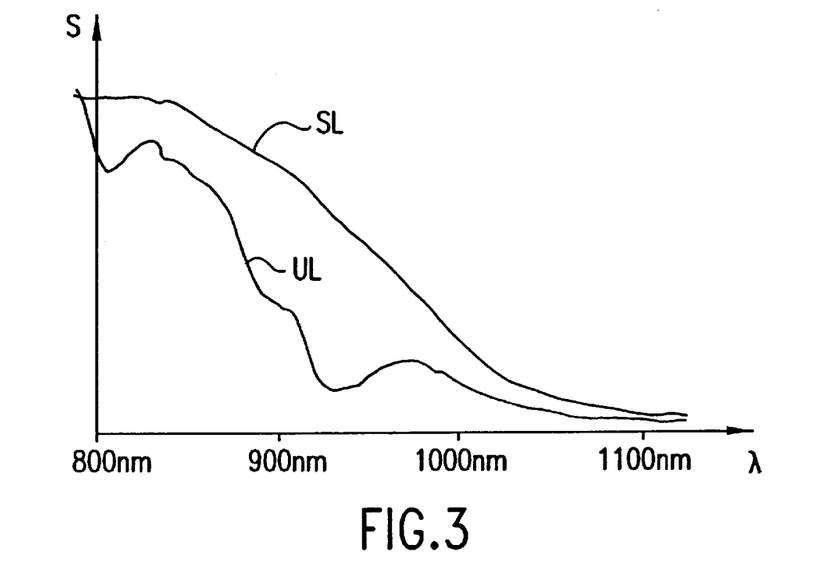
FIG. 3 is a graphic depiction of a typical spectral intensity distribution in the infrared range, for ambient light (UL) and the light of a light generating unit (SL)

The analyzing process is, among other things, designed such that possible interfering influences by ambient light are compensated. According to the invention, the separation between the ambient light and the sensor light takes place on the basis of the spectral differentiating characteristics in a purely mathematical manner. FIG. 3 illustrates the typical spectral plots in the infrared range of ambient light (UL) and light of a light generating unit (SL). Since, measurements show that the ambient light spectrum changes little in the course of a day, The pronounced differences of the spectrums (UL, SL) permit a reliable use of the following described process.

First, two reference spectrums are taken. Specifically, a spectrum of an $S_1(\lambda)$ for daylight when the light generating unit is switched off (that is, without sensor light) and the other spectrum $S_0(\lambda)$ when the ambient light is absent and the light generating unit is activated. In each case, spectrums are determined for a particular reference road covering.

Measurements show that the plot of the spectral reflection capacity for various road coverings can be closely approximated via monotonic, continuously extending curves which can be converted to one another by multiplication with a suitable function $P(\lambda, A, B, \ldots)$ with certain parameters A, B. With this assumption, the backscattered light spectrum measured on an arbitrary road covering is obtained from the product of the parameter-dependent function $P(\lambda, A, B, \ldots)$ with the sum from a fraction of the first reference spectrum $S_0(\lambda)$ and a fraction of the second reference spectrum $S_1(\lambda)$ The function thus obtained for the backscattered light spectrum of a dry arbitrary road is multiplied with an exponential absorption term $T(\lambda, d) = \exp(-\alpha(\lambda)d)$ which describes the light transmission of a water layer of a defined thickness d, wherein $\alpha(\lambda)$ is the wavelength-dependent absorption coefficient of water or ice. The absorption coefficient $\alpha(\lambda)$ has a known plot which may either be filed in a memory or in ranges may be approximated by analytical functions (for example, Gauss curves or Lorentz curves). Since the absorption spectrum is known to shift toward higher wavelengths with temperatures approaching the freezing point, it is advantageous to introduce (as a further parameter for adaptation) the temperature t into the approximation curves for $\alpha(\lambda)$ or to also file the curves for $\alpha(\lambda)$ in a parameterized manner according to the temperature.

In order to also detect a water layer on ice or an ice/water mixture, another parameter could be introduced for the ice ratio which determines the extent to which the absorption curves of water or ice are entered into the mathematical model for the absorption term $T(\lambda)$.

Altogether, a mathematical function is obtained for the wavelength-dependent course of the backscatter intensity which has the following form:

$$S(\lambda)=(aS_0(\lambda)+bS_1(\lambda)\,P(\lambda, A, B, C \ldots)T(\lambda, d, t),$$

wherein a and b are the respective fractions of the sensor light and the ambient light, so that a+b=1. For reasons of simplicity, a parameter for the ice fraction was not indicated here.

Using the actual measured values, the free parameters of the function for the backscatter intensity $S(\lambda)$ can be calculated to achieve a best possible approximation, which results (among other things), in the thickness d of the water layer. If n is the total number of parameters in $P(\lambda, A, B, C \ldots)$, via the measurement in the case of n+3 different wavelengths $\lambda_i$, an equation system with n+3 equations can be established. Depending on the selection of the function P, the equation system can be solved precisely or approximately. Thus the parameters A, B, . . . as well as the thickness d of the water layer, the water temperature t and the ratio factor a/b by which the two reference spectrums contribute can be determined.

If the number of measurements is >n+3, the equation system is overdetermined. In this case, the best-adapted solution can be found via a compensating calculation, whereby the influence of the signal noise can be reduced and the precision can be increased.

A simplified process can be used when the ratio factor a/b is determined in a wave range without significant water/ice absorption. In the wavelength ranges without significant water absorption, the transmission $T(\lambda, d)=1$ and the above equation for the backscatter intensity is simplified as follows:

$$S(\lambda)=aS_0(\lambda)+bS_1(\lambda)P(\lambda, A, B, C \ldots)$$

This equation must be met for all wavelengths from the ranges without water absorption. With a sufficient number of measuring points in the wavelength range without significant water/ice absorption, the parameters a, b, A, B, C . . . can be determined such that the sum of squares of the deviations with respect to the measured spectral curve $S(\lambda)$ is minimal over all wavelengths. By means of this compensating calculation, the best-approximating parameter-dependent function P (as well as the ratio factor a/b) by which the two reference spectrums contribute to the above-mentioned sum is calculated.

Now, since all parameters are known, the function $P(\lambda, A, B, C \ldots)$ can be interpolated into the range in which the absorption takes place. Via this calibration of the measuring system, the backscatter intensities for measuring points in the wavelength range with a significant water/ice absorption (in the case of a dry road surface condition) can be indicated as interpolation or extrapolation points. This interpolated curve corresponds to the measuring curve for a dry road.

In one technique described in German Patent Application DE 197 36 138, the difference with respect to the actual measuring curve is determined in a subsequent step. From the size of the difference surface and the position of the center of gravity, the water level, the water temperature and the presence of ice can be determined.

In a second technique, the function P determined in the range without water absorption and the ratio factor a/b can be put into the above overall formula for $S(\lambda)$ so that the compensating calculation for the measuring points in the range with a significant water/ice absorption can be carried out with a reduced number of parameters. Here, only the free parameters of the absorption term $T(\lambda, d, t)$ must be adapted. The adaptation then results in a determination of the water layer thickness d and in the water temperature t.

In a third variant, only the ratio factor a/b (determined in the range without water absorption) is carried over, while the parameter-dependent function $P(\lambda, A, B, C \ldots)$ together with the absorption term $T(\lambda, d, t)$ are again calculated in the sense of a best possible approximation, which results, among other things, in the thickness d of the water layer and in the water temperature t.

The possibility of also determining the water temperature or ice temperature in the same analyzing process offers the advantage that a foresighted warning can be derived: If water is present on the road and if this temperature is approaching the freezing point, the driver can be warned to expect freezing.

To facilitate the separation between ambient light and sensor light, the signals of an ambient light sensor can also be used (as it is already used in vehicles), or a sensor which determines the color temperature of the ambient light can also be used (as known from International Patent Document WO 97/27077). Such sensors are used in vehicles for the automatic switching-on of light during darkness and bad weather. By means of an ambient light sensor, the ratio factor a/b can be continuously sensed and fed into the above-mentioned analysis.

Since (in principle) the process according to the invention is independent of the ratio of backscattered ambient light and backscattered light of the light source, no additional measurements for shielding with respect to ambient light need be carried out. In particular, measurements can be carried exclusively in daylight. This has the additional advantage that the measurements can take place in a predetermined manner. Here, the scattered light of an area in front of the vehicle illuminated by ambient light is sensed and analyzed. Advantageously, a separate light source (sensor light) can be eliminated. At night and in twilight, the headlights of the vehicle can be utilized for the measurements so that an intensive light source of a wide range is available. Naturally, in this embodiment, the definition of the parameters a and b, which indicate the ratios of the sensor light and the ambient light, can also be provided to the analyzing process as a function of the activation of the headlights. In this situation, a headlight replaces the sensor light.

By means of processes which operate in a reflection, as mentioned in International Patent Document WO 96/26430, early recognition of road conditions is not possible (in principle), since the angle relationships defined by the laws of reflection cannot be maintained.

In an embodiment of the present invention, the spectrometer described in FIG. 1 is an imaging spectrometer. In this instance, each point in the input gap is clearly imaged on a gap or line in the detector plane sensing the spectrum. Here, the detector must be a two-dimensional diode array or CCD array. This permits a spatially one-dimensional locally resolved measuring through which, for example, a locally resolved analysis of the road condition can be carried out over the whole road width. As an alternative, optical signals, which come from various measuring points on the vehicle (particularly, from measuring points in the proximity of the wheels) and are guided to the spectrometer via optical light guides, can be analyzed in a unit (such as a CPU or microprocessor) independently of one another.

In the spectrometric measuring arrangement illustrated in FIG. 1, the light backscattered from the road is spectrally divided and the spectrum is imaged on a diode line or CCD line. Here, each individual pixel is exposed to a very narrowly limited wavelength range. The high costs for the spectrometer are the disadvantage of this process.

According to another embodiment of the present invention, as an alternative to a spectrometer having, for example, an interference filter as a dispersive element, detectors of different spectral sensitivities can also be used. These may be photodiodes which have different spectral sensitivities (for example, made of Si, Ge or InGaAs), or whose spectral sensitivity is modified by broad-band filters. A reasonably priced solution is the use of filters which may consist, for example, of colored glasses or plastic materials and which exhibit typical absorption and transmitting characteristics in the wavelength range to be examined. If several detectors with different filters are used for the receiver, the individual signals contain mutually independent information concerning the spectral distribution of the input light.

Since (in the case of these measuring arrangements) the light is not spectrally divided, the above-described analyzing process according to the invention cannot be used. To account for this, a second inventive process is therefore provided, which can be used for measuring arrangements in which the light is not spectrally divided.

The light intensity Ii totally converted by such a detector i is obtained as the integral of the wavelength by way of the product function from the spectral sensitivity $E_i(\lambda)$ of the photodetector and of the wavelength-dependent backscatter intensity $S(\lambda)$:

$$I_i = \int E_i(\lambda) S(\lambda) d\lambda$$

According to the plot of the sensitivity curves $E_i(\lambda)$, the water absorption has different effects on the individual detectors i.

During the second analysis process according to the invention, the wavelength-dependent backscatter intensity $S(\lambda)$ is now (as in the first process according to the invention) arranged as a parameter-dependent function $S(\lambda, A, B, \ldots)$. This, in turn, is obtained as the product an exponential absorption term and a function describing the wavelength-dependent scatter coefficient of a dry road surface.

By using a correspondingly large number of detectors with mutually linearly independent spectral sensitivity courses $E_i(\lambda)$, an equation system is again obtained. From this the free parameters, the water thickness, the water temperature, etc. can be determined. Preferably (here also), the number of measuring points is larger than the number of detectors, so that the equation system is overdetermined. Additionally, via a compensating calculation, the influence of the signal noise can be reduced and the precision can be increased.

Figure 2:
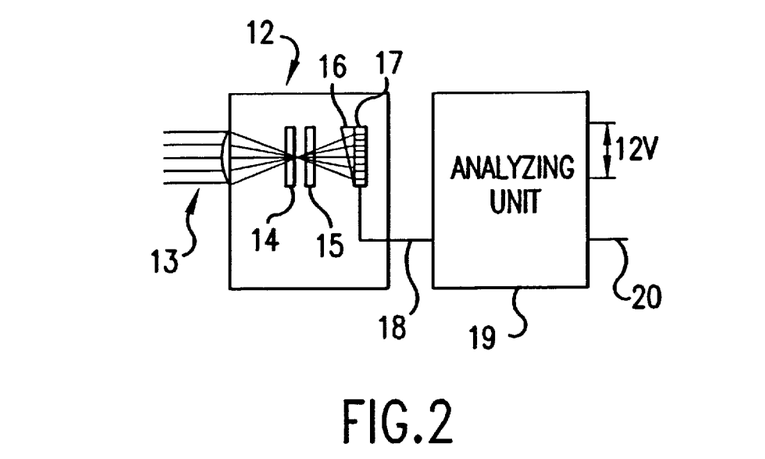
FIG. 2 is a schematic block diagram of the receiver side of a second system for implementing the process according to the invention for determining the condition of a road surface.

FIG. 2 shows a system according to the invention which is suitable, among other things, for implementing the process according to the invention.

A light generating unit, which emits a broad-band parallel light cluster in the infrared range and illuminates the road surface for measuring purposes, is not separately illustrated. This light generating unit may be constructed in a similar manner to that of FIG. 1. The selection of a wavelength range between approximately 800 nm and approximately 1,150 nm has the advantage that reasonably priced silicon detectors can be used. Via a lens system and/or fiber-optical light guides, a receiver 12 receives the light 13 backscattered to it from the road surface, which includes both light 13 from the light generating unit (sensor light) and ambient light. By means of an apertured diaphragm 14 and a cylinder lens 15 (as the cross-sectional transducers), the light 13 is imaged as uniformly as possible on a silicon photodetector in the form of a CCD sensor line 17. Each line pixel of the sensor line 17 is provided with a broad-band filter through which the light must pass before impinging thereon. In this instance, the spectral sensitivities of the filters assigned to the pixels are selected in a mutually independent fashion.

Preferably, the broad-band filter in front of each pixel is formed by an absorption filter whose absorption characteristic is a function of the filter thickness. Such absorption filters consist of plastic or glass. (A typical example, is colored glass of the name RG 1000). According to the invention, the absorption filters assigned to the pixels are combined in an absorption line filter 16 extending along the sensor line 17, whose filter thickness varies along the sensor line, such that a filter thickness and (thus a spectral sensitivity curve) is assigned to each pixel in a reversibly clear manner.

In a preferred embodiment, the absorption line filter 16 is constructed in a wedge shape; i.e., as a colored glass wedge.

The output signal 18 of the CCD line 17 is fed to an analyzing unit 19 (for example, a CPU or microprocessor) which is fed by a 12V supply voltage and is connected to a data bus 20, such as a CAN bus. The analyzing unit 19 is designed (in a suitable manner) for analyzing the output signal 18 of the CCD line 17 according to the process of the invention.

Specifically, the process takes place as follows: Each pixel (i.e., each scanning unit cell of the CCD line 17) receives backscattered light which is modified in its spectral distribution by the assigned absorption filter with the assigned filtering curve. The contribution of each pixel i of this type to the output signal 18 corresponds to the totally converted light intensity $I_i$, and (as indicated above) is obtained mathematically as an integral of the wavelength $\lambda$ over the spectral sensitivity $E_i(\lambda)$ of the absorption filter assigned to the pixel i multiplied with the wavelength-dependent backscatter intensity $S(\lambda)$.

The following transmission law applies to the spectral sensitivity $E_i(\lambda)$ of homogeneous absorption filters:

$$E_i(\lambda) = \exp(-\alpha_F(\lambda)D_i)$$

wherein $D_i$ is the filter thickness at the location of the pixel i, and $\alpha_F(\lambda)$ is the absorption coefficient which is dependent only on the filter material.

From the output signals of the pixels of the CCD line 17 (with a sufficiently large number of line pixels), the analyzing unit can now carry out the second process for determining the condition of a road surface. In this case, the backscatter intensity is arranged as a parameter-dependent function $S(\lambda, A, B, \ldots)$ and the measured intensities $I_i$ are used for determining the parameters of interest.

In an advantageous further embodiment of the system according to the invention, a filter material is selected in which a linear connection $$ln\alpha_F(\lambda) = a\lambda + b$$

exists between the logarithm of the absorption coefficient and the wavelength. This is met by many typical filter materials, for example, by colored glass RG 1000. This interrelationship leads to a general displacement law $$E(\lambda, D) = E(\lambda + \lambda_0, D_0)$$

with $$\lambda_0 = ln(D/D_0)/a,$$

according to which a change of the filter thickness D causes a displacement of the transmission curve $E(\lambda)$ in the wavelength range. This occurs without a change of the transmission curve's plot $E(\lambda)$.

Figure 4:
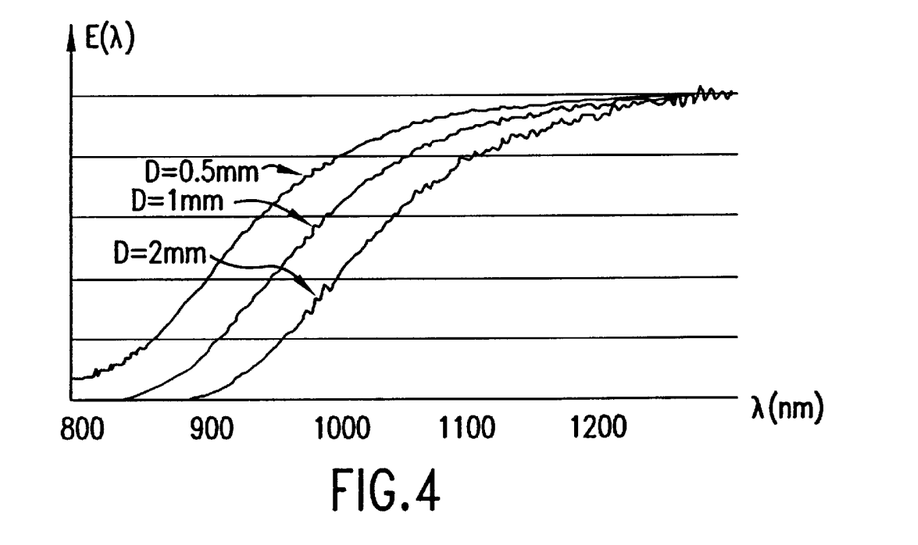
FIG. 4 depicts of the transmission curves of absorbing colored glass of different thicknesses D.

FIG. 4 illustrates transmission curves $E(\lambda)$ for 3 filter thicknesses D.

For the total intensity I (D), which passes through a filter of the thickness D and impinges on a detector, via the displacement law, the following conversion is obtained:

$$I(D) = \int E(\lambda, D)S(\lambda)d\lambda = \int E(\lambda + \lambda \text{hd } 0, D_0)S(\lambda)d\lambda = I(\lambda_0)$$

This means that, after passing through a filter of the thickness D, the total intensity I(D) can be represented as a convolution integral via the scatter intensity $S(\lambda)$, with a convolution core which describes the sensitivity of the filter (in the case of a reference thickness $D_0$). The total intensity can be understood as the function $I(\lambda_0)$ of the variable $\lambda_0$ which is connected with the thickness D by the formula, $$\lambda_0 = ln(D/D_0)/a$$

as noted above.

Subsequently, if a plurality of detectors having filters of a respective defined thickness or $\lambda_0$ are used, the convolution curve of the spectrum to be measured with the transmission curve of the filter is obtained from the totality of the measured intensities.

Known mathematical processes exist for recovering the original spectrum from such a convolution curve in the case of a known transmission (for example, by Fourier transforms). In the case of a Fourier transform, the convolution integral in the Fourier space changes into a product. The equation can therefore be resolved algebraically in the Fourier space, according to the Fourier transform of the scatter intensity S. The latter will then be obtained as the quotient of the Fourier transform of the measured total intensity I and the Fourier transform of the transmission curve E. By means of an inverse Fourier transform, the spectrum $S(\lambda)$ can therefore be reconstructed from the totality of the measured intensities I in the case of different thicknesses or $\lambda_0$.

In the present embodiment according to the invention, the system is a spectrometer which can be used not only for recognizing the road condition, but for all applications in which a spectrum must be measured. In contrast to known spectrometers, an absorbing element is used instead of a dispersive element. This has the advantage that it can be applied directly to the CCD sensor line. The expenditures for the required Fourier inverse transform can be kept low, since this is a standard operation which is provided by commercially available microprocessors. On the whole, the system according to the invention represents an advantageous alternative to commercially available spectrometers.

The spectrums measured in this manner can be analyzed in order to evaluate the backscatter intensity $S(\lambda)$ according to both described processes. The spectrums may be analyzed according to the process described in German Patent Application DE 197 36 138; however, other analyses are also conceivable which include, for example, differentiating the curve $S(\lambda_0)$, or its direct analysis via heuristic methods.

In still another embodiment of the present invention, where the absorbing element is, for example, a colored glass wedge, if a two-dimensional array is used (instead of a diode line or CCD line), the system will permit measurements which are resolved locally.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A process for determining the condition of a road surface, comprising:

beaming light onto the road surface;

dividing backscattered light from the road surface into spectral components;

analyzing the spectral components of the backscattered light to obtain a spectral analysis; and determining a condition of the road surface with respect to a presence of at least one of water and ice, based on the analysis of the spectral components of the backscattered light;

wherein said analyzing step includes arranging a wavelength-dependent plot of a backscatter intensity for the spectral analysis of the backscattered light as a product of a function having free parameters which represents a wavelength-dependent backscatter light spectrum of a dry road surface, and an exponential absorption term which describes a light transmission of a water layer having a defined thickness; and calculating the free parameters via actual measured values to obtain an optimum approximation value;

and wherein the condition of the road surface is determined based on the approximation value.

2. The process according to claim 1, further comprising:

arranging a backscattered light spectrum of a dry road as a parameter-dependent wavelength-dependent function which is multiplied by a sum of a first ratio of a first reference spectrum and a second ratio of a second reference spectrum, where for a reference road covering, the first reference spectrum is obtained in ambient light when a light generating unit is activated, and the second reference spectrum is obtained in daylight when the light generating unit is deactivated; and determining a ratio factor based on the contribution of the first and second reference spectrums.

3. The process according to claim 2, wherein at least one of the ratio factor and the parameter-dependent wavelength-dependent function are determined in a wave range in the absence of at least one of water and ice absorption.

4. The process according to claim 1, wherein:

additional parameters, other than water thickness, are determined from the approximation value and entered into the exponential absorption term, said additional parameters including at least one of water temperature, ice temperature, and a parameter for an ice fraction; and actual absorption curves of at least one of water and ice are used as a formation basis.

5. The process according to claim 4, wherein at least one of the water temperature is indicated and a warning is emitted when the water temperature approaches freezing levels.

6. The process according to claim 2, wherein:

the ratio factor is sensed at least at times continuously, via an ambient sensor and is used for analysis in place of the ratio factor calculated from a previous approximation.

7. The process according to claim 3, wherein:

the ratio factor is sensed at least at times continuously, via an ambient sensor and is used for analysis in place of the ratio factor calculated from a previous approximation.

8. A process for determining the condition of a road surface, said process comprising:

scattering light onto the road surface;

detecting light backscattered from the road surface with photo detectors having respective different spectral sensitivities;

determining a condition of the road surface with respect to a presence of at least one of water and ice, based on analysis of measuring signals representative of respective light intensity values $I_i$ detected by said detectors with different spectral sensitivities;

wherein said analysis of measuring signals includes converting each light intensity $I_i$;

representing each converted light intensity $I_i$, as an integral of a wavelength with a production function of the spectral sensitivity $E_i(\lambda)$ of an associated photodetector and the wavelength-dependent backscatter intensity $S(\lambda)$, for analysis by the detectors;

arranging a wavelength-dependent backscatter intensity $S(\lambda)$ as a product of a function having free parameters which represents a wavelength-dependent backscatter light spectrum of a dry road surface, and an exponential absorption term which defines a light transmission of a water layer having a defined thickness; and calculating the free parameters via actual measured values to obtain an optimum approximation value;

and wherein the condition of the road surface is determined based on the approximation value.

9. The process according to claim 8, further comprising:

arranging a backscattered light spectrum of a dry road as a parameter-dependent wavelength-dependent function which is multiplied by a sum of a first ratio of a first reference spectrum and a second ratio of a second reference spectrum, where for a reference road covering, the first reference spectrum is obtained in ambient light when a light generating unit is activated, and the second reference spectrum is obtained in daylight when the light generating unit is deactivated; and determining a ratio factor based on the contribution of the first and second reference spectrums.

10. The process according to claim 9, wherein at least one of the ratio factor and the parameter-dependent wavelength-dependent function are determined in a wave range in the absence of at least one of water and ice absorption.

11. The process according to claim 8, wherein:

additional parameters, other than water thickness, are determined from the approximation value and entered into the exponential absorption term, said additional parameters including at least one of water temperature, ice temperature, and a parameter for an ice fraction; and actual absorption curves of at least one of water and ice are used as a formation basis.

12. The process according to claim 11, wherein at least one of the water temperature is indicated and a warning is emitted when the water temperature approaches freezing levels.

13. An apparatus for analyzing light, comprising:

a receiver unit having a plurality of detectors for measuring backscattered light; and a plurality of filters, the spectral sensitivity of the detectors differing based upon the plurality of filters; wherein the detectors are pixels of a sensor line;

the filters are absorption filters having bodies which are made from a material selected from the group consisting of glass and plastic;

an absorption characteristic of said absorption filters depends on a thickness of the absorption filters;

the absorption filters are combined to form an absorption line filter which is disposed in a light passage direction in front of the sensor line and whose thickness varies such that one filter thickness and thus one spectral sensitivity is assigned to each pixel.

14. Apparatus according to claim 13, wherein the absorption line filter is a colored glass wedge.

15. The apparatus according to claim 13, wherein the filter material is selected such that a linear interrelationship exists between a logarithm of an absorption coefficient of said absorption filters and a wavelength of light incident thereon, and further comprising:

an analyzing unit which initially computes a Fourier transform from a totality of measured pixel intensities, and subsequently computes a quotient from a Fourier transform of the measured pixel intensities and a Fourier transform of a transmission curve of the absorption filters, and then calculates a wavelength-dependent spectral intensity of the light via a Fourier inverse transform.

16. The apparatus according to claim 14, wherein the filter material is selected such that a linear interrelationship exists between a logarithm of an absorption coefficient of said absorption filters and a wavelength of light incident thereon, and further comprising:

an analyzing unit which initially computes a Fourier transform from a totality of measured pixel intensities, and subsequently computes a quotient from a Fourier transform of the measured pixel intensities and a Fourier transform of a transmission curve of the absorption filters, and then calculates a wavelength-dependent spectral intensity of the light via a Fourier inverse transform.

17. The apparatus according to claim 15, wherein the analyzing unit is a microprocessor.

18. The apparatus according to claim 16, wherein the analyzing unit is a microprocessor.

19. The apparatus according to claim 15, wherein the computation of the quotient from the Fourier transform of the measured pixel intensities and the Fourier transform of the transmission curve of the filter is performed for a defined reference thickness $D_0$.

20. The apparatus according to claim 16, wherein the computation of the quotient from the Fourier transform of the measured pixel intensities and the Fourier transform of the transmission curve of the filter is performed for a defined reference thickness $D_0$.

21. The apparatus according to claim 18, wherein the detectors are pixels.

22. An apparatus for analyzing light, comprising:

a receiver unit having a plurality of detectors, the detectors having differing spectral sensitivities;

a sensor line having disposed therein the plurality of detectors; and an absorption filter, comprising at least one of glass bodies and plastic bodies, whose absorption characteristic depends on a thickness of the absorption filters;

wherein the absorption filters are combined to form an absorption line filter disposed in a light passage direction in front of the sensor line and whose thickness varies such that one filter thickness and thus one spectral sensitivity is assigned to each detector.

* * * * *